United States Patent
Hao et al.

(10) Patent No.: US 8,462,760 B2
(45) Date of Patent: Jun. 11, 2013

(54) METHOD AND DEVICE FOR CONTROLLING SIGNAL TRANSMISSION

(75) Inventors: Peng Hao, Shenzhen (CN); Chunli Liang, Shenzhen (CN); Bo Dai, Shenzhen (CN); Bin Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 194 days.

(21) Appl. No.: 13/061,506

(22) PCT Filed: May 15, 2009

(86) PCT No.: PCT/CN2009/071817
§ 371 (c)(1),
(2), (4) Date: Feb. 28, 2011

(87) PCT Pub. No.: WO2010/034197
PCT Pub. Date: Apr. 1, 2010

(65) Prior Publication Data
US 2011/0164604 A1    Jul. 7, 2011

(30) Foreign Application Priority Data
Sep. 23, 2008 (CN) .......................... 2008 1 0166330

(51) Int. Cl.
*H04J 3/00* (2006.01)
*H04L 27/00* (2006.01)
*H04L 1/00* (2006.01)

(52) U.S. Cl.
USPC ........... 370/345; 370/276; 370/277; 370/280; 370/480; 370/482

(58) Field of Classification Search
None
See application file for complete search history.

(56) References Cited

U.S. PATENT DOCUMENTS

| 2008/0045259 A1 | 2/2008 | Shen et al. |
| 2008/0045260 A1 | 2/2008 | Muharemovic et al. |

FOREIGN PATENT DOCUMENTS

| CN | 101197615 A | 6/2008 |
| CN | 101242239 A | 8/2008 |
| RU | 2005129097 A | 3/2006 |
| WO | 2004/075595 A2 | 9/2004 |
| WO | 2010019012 A2 | 2/2010 |
| WO | WO 2010/019012 A2 * | 2/2010 |

OTHER PUBLICATIONS

3GPP TS 36.211 (Physical channels and modulation, EUTRA, V8.3.0, p. 33, May 2008).*
ETSI TS 36 211 (Physical channels and modulation, LTE; EUTRA, V8.5.0, Feb. 2009).*

(Continued)

*Primary Examiner* — Andrew Chriss
*Assistant Examiner* — Ajit Reddy
(74) *Attorney, Agent, or Firm* — Knobbe Martens Olson & Bear LLP

(57) ABSTRACT

The method for controlling signal transmission includes: determining the first reference variable according to the number of transition points from downlink to uplink in a wireless frame of the system and the system frame number (S502); determining the second reference variable according to the number of transition points from downlink to uplink in a wireless frame and the time slot number (S504); determining the third reference variable according to the sub-frame offset of the signal (S506); and determining signal transmission times according to the first reference variable, the second reference variable and the third reference variable, so as to control the signal transmission (S508).

3 Claims, 5 Drawing Sheets

OTHER PUBLICATIONS

International Search Report in international application No. PCT/CN2009/071817, mailed on Aug. 6, 2009.
Written Opinion of the International Search Authority in international application No. PCT/CN2009/071817, mailed on Aug. 6, 2009.
3GPPTS 36.211 V8.3.0, 3rd Generation Partnership Project (May 2008) in 4 pages.
Way Forward on SRS in TDD, 3GPP TSG RAN WG1 Meeting #54bis, Prague, Czech Republic (Sep. 29-Oct. 3, 2008) in 9 pages.
3GPP TS 36.211 V8.5.0, 3rd Generation Partnership Project (Dec. 2008) in 5 pages.
Extended European Search Report received in European Application No. 09815567.4, mailed on Jan. 10, 2013 in 5 pages.

* cited by examiner

METHOD AND DEVICE FOR CONTROLLING SIGNAL TRANSMISSION

TECHNOLOGY FIELD

The present invention relates to the field of communications, particularly to a method and device for controlling signal transmission.

BACKGROUND

The frame structure under TDD (Time Division Duplex) mode in the LTE (Long Term Evolution) system is also called "Frame Structure Type 2". FIG. 1 is a schematic diagram of this frame structure. As shown in FIG. 1, in this frame structure, a 10 ms (307200 Ts, 1 ms=30720 Ts) wireless frame is divided into two half-frames. The length of each half-frame is 5 ms (153600Ts). Further, each half-frame contains five sub-frames, and each sub-frame is 1 ms in length.

Table 1 shows the configuration of the uplink/downlink signals of each sub-frame in the frame structure as shown in FIG. 1. Wherein D denotes downlink sub-frames which are used for transmitting downlink signals; and U denotes uplink sub-frames (or called normal uplink sub-frames) which are used for transmitting uplink signals. Further, an uplink/downlink sub-frame is divided into two time slots with length of 0.5 ms each; and S denotes special sub-frames. A special sub-frame contains three special time slots, namely: a Downlink Pilot Time Slot (DwPTS), a Guard Period (GP) and an Uplink Pilot Time Slot (UpPTS). In real systems, the uplink/downlink configuration indexes are informed to a User Equipment (UE) through broadcast messages.

The resource allocation in the LTE system takes a Physical Resource Block (PRB) or a Resource Block (RB) as a unit, wherein each PRB occupies 12 sub-carriers (or called Resource Element (RE), each sub-carrier is 15 kHz) in the frequency domain and occupies a time slot in the time domain, namely, it occupies SC-FDMA (Single Carrier-Frequency Division Multiple Access) symbols of 7 normal cyclic prefixes (normal CP) or 6 extended cyclic prefixes (extended CP) in the time domain. If the total number of RBs to which the uplink system bandwidth corresponds in the frequency domain is $N_{RB}^{UL}$, then indexes of the RB will be 0, 1, . . . , and $N_{RB}^{UL}-1$ and indexes of the RE will be 0, 1, . . . , and $N_{RB}^{UL} \cdot N_{SC}^{RB}-1$, wherein $N_{SC}^{RB}$ is the number of sub-carriers to which one RB corresponds in the frequency domain. Taking normal CP for example, the structure of the PRB is shown in FIG. 2. One PRB occupies 12 REs in the frequency domain and occupies 7 normal CPs in the time domain. The total number of RBs to which the uplink system bandwidth corresponds in the frequency domain is $N_{RB}^{UL}$, the indexes of the RB are 0, 1, . . . , and $N_{RB}^{UL}-1$, and the indexes of the RE are 0, 1, . . . , and $N_{RB}^{UL} \cdot N_{SC}^{RB}-1$.

The bandwidth of Sounding Reference Signal (SRS) is configured by adopting a tree structure, namely, each kind of SRS bandwidth configuration corresponds to a tree structure, the tree structure is shown in FIG. 3. Wherein The SRS-bandwidth at the top layer corresponds to the maximum bandwidth of this kind of SRS bandwidth configuration. Tables 2 to 5 show the SRS bandwidth configuration in different uplink bandwidth range. Taking Table 2 for example, the number of RB is $6 \leq N_{RB}^{UL} \leq 40$, wherein SRS bandwidth configuration is 1, b=0 is the first layer, and is the top layer of the tree structure, the SRS-bandwidth of this layer is the bandwidth to which 32 PRBs correspond and is the maximum SRS-bandwidth of the SRS bandwidth configuration; b=1 is the second layer, the SRS-bandwidth of this layer is the bandwidth to which 16 PRBs correspond, and one SRS-bandwidth of the upper layer is split into two SRS-bandwidths of the second layer; b=2 is the third layer, the SRS-bandwidth of this layer is the bandwidth to which 8 PRBs correspond, and one SRS-bandwidth of the upper layer is split into two SRS-bandwidths of the third layer; b=3 is the fourth layer, the SRS-bandwidth of this layer is the bandwidth to which 4 PRBs correspond, and one SRS-bandwidth of the upper layer is split into two SRS-bandwidths of the fourth layer. Tables 3 to 5 show the SRS bandwidth configuration respectively when the number of the RB is $40 < N_{RB}^{UL} \leq 60$, $60 < N_{RB}^{UL} \leq 80$ and $80 < N_{RB}^{UL} \leq 110$. Further, the sub-carriers of the SRS signals in the same SRS frequency band are placed alternately, this structure is shown in FIG. 4, and this comblike structure allows more users to send SRS signals in the same SRS-bandwidth.

TABLE 1

| Configuration | Switch-point period | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

$(6 \leq N_{RB}^{UL} \leq 40)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 3

$(40 < N_{RB}^{UL} \leq 60)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 4

$(60 < N_{RB}^{UL} \leq 80)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 5

$(80 < N_{RB}^{UL} \leq 110)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

With respect to the above-showed SRS bandwidth configuration, when the SRS-bandwidth allocated to a UE is smaller than the maximum SRS-bandwidth, frequency hopping should be adopted so that all frequency bands within the range of the maximum SRS-bandwidth have opportunities to transmit SRS. As frequency hopping arithmetic is based on SRS transmission times, therefore, SRS transmission times require continuous increment. Further, in order to make the frequency hopping process controllable, then requires the UEs with the same SIRS period have same SRS transmission times at the same time.

With respect to the TDD system, the SRS signal transmission position of the UE is informed by a base station through UE specific signaling. UE specific signaling refers to that this signaling is sent to a specific UE only. The base station informs UE specific SRS period and sub-frame offset configuration index to UE, each configuration index corresponds to a period and sub-frame offset, the condition to which this configuration corresponds is shown in Table 6.

TABLE 6

| Configuration Index, $I_{SRS}$ | SRS Period (ms) | SRS Sub-frame Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |

TABLE 6-continued

| Configuration Index, $I_{SRS}$ | SRS Period (ms) | SRS Sub-frame Offset |
|---|---|---|
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

In Table 6, the meaning of SRS Sub-frame Offset may include the following two circumstances.

Circumstance 1, the SIRS period is 2 ms:

(1) Sub-frame offset $N_{offset}$ is 2, 3 and 4, representing the first, second and third uplink sub-frames in a half-frame respectively;

(2) When there are two SC-FDMA symbols in the UpPTS, sub-frame offset 0 stands for the first SC-FDMA symbol in the UpPTS, and sub-frame offset 1 stands for the second SC-FDMA symbol in the UpPTS; when there is one SC-FDMA symbol in the UpPTS, sub-frame offset 0 or 1 stands for the only SC-FDMA symbol in the UpPTS.

Circumstance 2, the SRS period is great r than 2 ms, and one SRS period $T_{SRS}$ contains $$\frac{T_{SRS}}{5}$$

half-frames:

(1) When sub-frame offset $N_{offset}$ satisfies ($N_{offset}$ mod 5)≦1,

If there are two symbols in the UpPTS, then $N_{offset}$ mod 5=0, 1 stand for the first and second SC-FDMA symbol in the UpPTS within the $$\left(\left\lfloor \frac{N_{offset}}{5} \right\rfloor + 1\right)^{th}$$

half-frame respectively;

If there are two symbols in the UpPTS, then $N_{offset}$ mod 5=0 or 1 stands for the only SC-FDMA symbol in the UpPTS within the $$\left(\left\lfloor \frac{N_{offset}}{5} \right\rfloor + 1\right)^{th}$$

half-frame;

(2) When sub-frame offset $N_{offset}$ satisfies ($N_{offset}$ mod 5)>1, $N_{offset}$ denotes the (($N_{offset}$ mod 5)−2+1)$^{th}$ uplink sub-frame of the $$\left(\left\lfloor \frac{N_{offset}}{5} \right\rfloor + 1\right)^{th}$$

half-frame of SRS in a SRS period.

Currently, SRS transmission times are calculated according to Formula $n_{SRS}=\lfloor(n_f \times 10+\lfloor n_s/2 \rfloor)/T_{SRS}\rfloor$. When the SRS period is greater than 2 ms, the SRS transmission times calculated with this formula may meet requirements, but when SRS period is 2 ms, the SRS transmission times that calculated with this formula are discontinuous. For example, for configuration 0 in Table 6, when a wireless frame has two transition points from downlink to uplink, the SRS have the same SRS transmission times on the two symbols of UpPTS $$\left(\text{namely sub-frame 1}, \left\lfloor \frac{n_s}{2} \right\rfloor = 1\right),$$

there is no continuous increment, not to meet the requirements.

Currently, when the SRS period is 2 ms, no effective solution is available to solve the problem of that the calculation result of SRS transmission times is discontinuous yet.

SUMMARY

The present invention is put forward by taking the problem into consideration, which is that the calculation result of SRS transmission times is discontinuous when the SRS period is 2 ms. Therefore, the main purpose of the present invention is to provide a modified solution for controlling signal transmission, to solve above-mentioned problem.

In order to realize the above-mentioned purpose, a method for controlling signal transmission is provided according to one aspect of the present invention.

The method for controlling signal transmission according to the present invention comprises: determining a first reference variable according to the number of transition points from downlink to uplink in a wireless frame of a system and a system frame number; determining a second reference variable according to the number of transition points from downlink to uplink in a wireless frame and a time slot number; determining a third reference variable according to the sub-frame offset of the signal; determining signal transmission times according to the first reference variable, the second reference variable and the third reference variable, so as to control the signal transmission.

Preferably, the operation of determining signal transmission times according to the first reference variable, specifically, the second reference variable and the third reference variable may comprise: treating the sum of the first reference variable, the second reference variable and the third reference variable as the transmission times.

Preferably, the first reference variable $n_1$ may be determined with the following formula: $n_1 = 2N_{SP}n_f$, wherein $N_{SP}$ is the number of transition points from downlink to uplink in a wireless frame, and $n_f$ is the system frame number.

Preferably, the second reference variable $n_2$ may be determined with the following formula:

$$n_2 = 2(N_{SP} - 1)\left\lfloor \frac{n_s}{10} \right\rfloor,$$

wherein $N_{SP}$ is the number of transition points from downlink to uplink in a wireless frame, and $n_s$ is the time slot number.

Preferably, the third reference variable $n_3$ may be determined with the following formula:

$$n_3 = \left\lfloor \frac{T_{offset}}{T_{offset\_max}} \right\rfloor,$$

wherein $T_{offset}$ is the sub-frame offset of the signal, and $T_{offset\_max}$ is the maximum sub-frame offset of the signal.

Preferably, the transmission times of the signal $n_{SRS}$ may be determined with the following formula:

$$n_{SRS} = 2N_{SP}n_f + 2(N_{SP} - 1)\left\lfloor \frac{n_s}{10} \right\rfloor + \left\lfloor \frac{T_{offset}}{T_{offset\_max}} \right\rfloor,$$

wherein $n_1 = 2N_{SP}n_f$ is the first reference variable, $$n_2 = 2(N_{SP} - 1)\left\lfloor \frac{n_s}{10} \right\rfloor$$

is the second reference variable, $$n_3 = \left\lfloor \frac{T_{offset}}{T_{offset\_max}} \right\rfloor$$

is the third reference variable, $N_{SP}$ is the number of transition points from downlink to uplink in a wireless frame, $n_f$ is the system frame number, $n_s$ is the time slot number, $T_{offset}$ is the sub-frame offset of the signal and $T_{offset\_max}$ is the maximum sub-frame offset of the signal.

Wherein the above-mentioned $\lfloor \ \rfloor$ means rounding down. $N_{SP}$, $n_f$, $n_s$ and $T_{offset}$ all are non-negative integers.

According to another aspect of the present invention, a device for controlling signal transmission is provided.

The device for controlling signal transmission according to the present invention comprises: an inputting module, which is used to input the number of transition points from downlink to uplink in a wireless frame of a system, a system frame number, a time slot number and a sub-frame offset of the signal; a first processing module, which is used to determine the first reference variable according to the number of transition points from downlink to uplink in a wireless frame of the system and the system frame number; a second processing module, which is used to determine the second reference variable according to the number of transition points from downlink to uplink in a wireless frame and the time slot number; a third processing module, which is used to determine the third reference variable according to the sub-frame offset of the signal; a control module, which is used to determine transmission times of the signal according to the first reference variable determined by the first processing module, the second reference variable determined by the second processing module and the third reference variable determined by the third processing module.

Preferably, the above-mentioned control module may be an adder.

In virtue of at least one of the above-mentioned technical solutions of the present invention, by calculating the corresponding reference variables according to the related parameters and treating the sum of the reference variables as the transmission times, the continuous SRS transmission times can be calculated, and the aim that the UEs with the same SRS period have the same SRS transmission times at the same time can be achieved, thereby the perfect frequency hopping performance can be obtained.

BRIEF DESCRIPTION OF THE DRAWINGS

The drawings are intended to provide further understanding on the present invention and constitute a part of the Description, and are intended to explain the present invention in connection with the embodiments of the present invention but not to limit the present invention. Among the drawings.

DETAILED DESCRIPTION

Function Overview

In the technical solutions provided by the embodiments of the present invention, by calculating the corresponding reference variables (the first reference variable, the second reference variable and the third reference variable) according to the related parameters (the number of transition points from downlink to uplink in a wireless frame, the system frame number, the time slot number, the sub-frame offset of the signal and the maximum sub-frame offset of the signal) and treating the sum of the corresponding reference variables as transmission times of the signal, the continuous SRS transmission times can be calculated.

The present invention is described in detail below in connection with drawings. If there is no conflict, the embodiments and the characteristics in the embodiments of the present invention may be combined with each other.

Method Embodiments

According to the embodiment of the present invention, a method for controlling signal transmission is provided.

Figure 1:
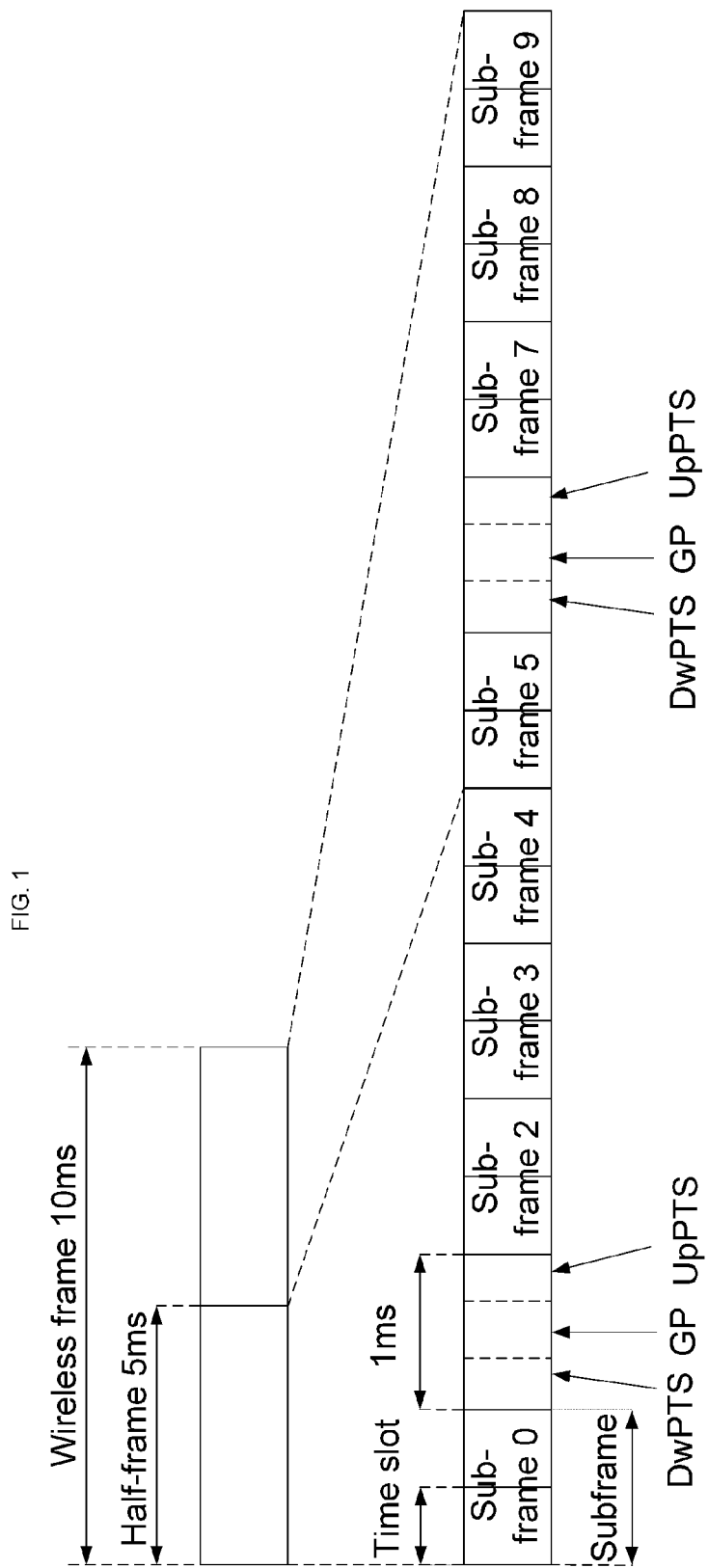
FIG. 1 is a schematic diagram of the frame structure under TDD mode in the LTE system according to related art.
Figure 2:
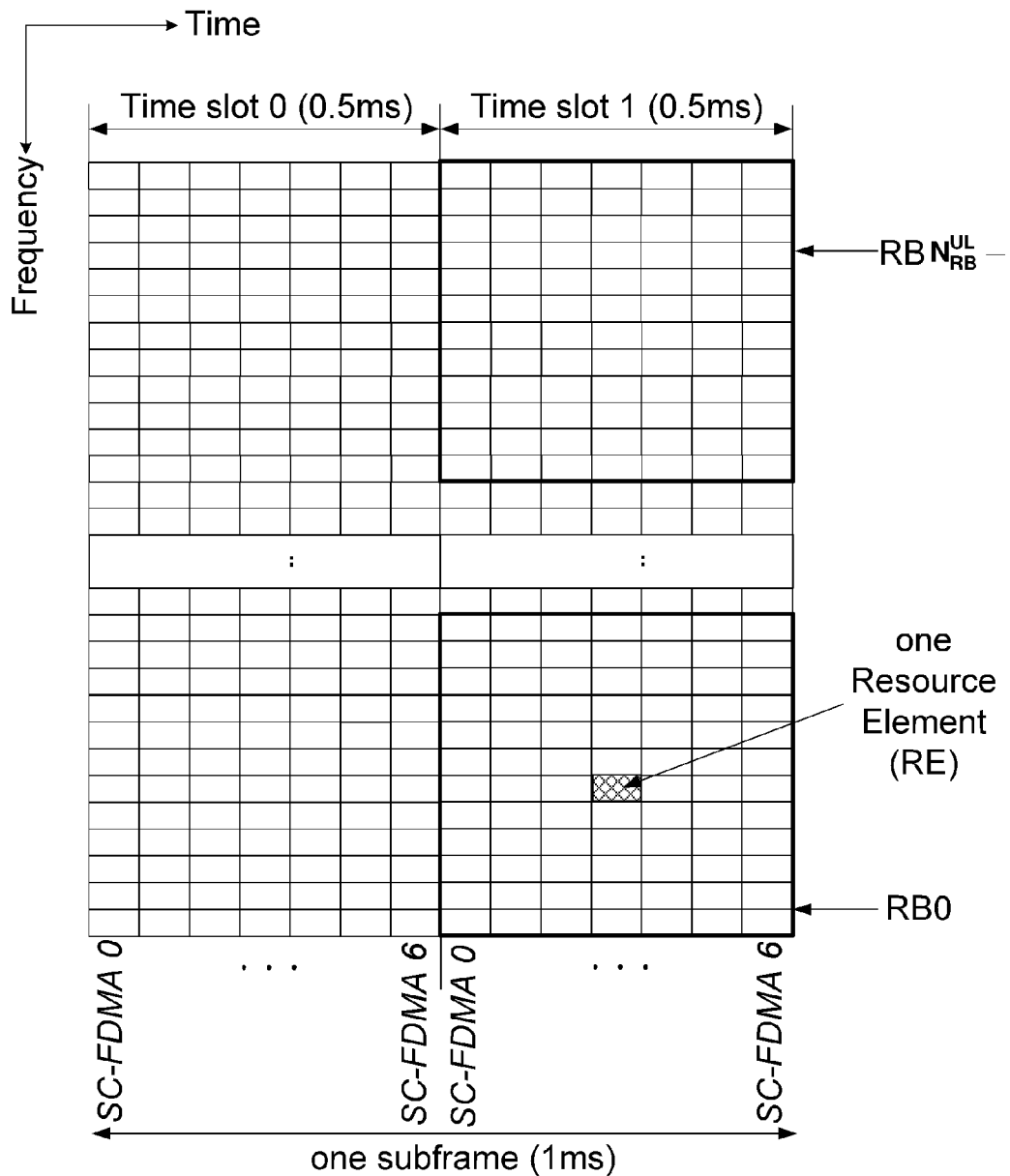
FIG. 2 is a structure schematic diagram of the PRB according to related art.
Figure 3:
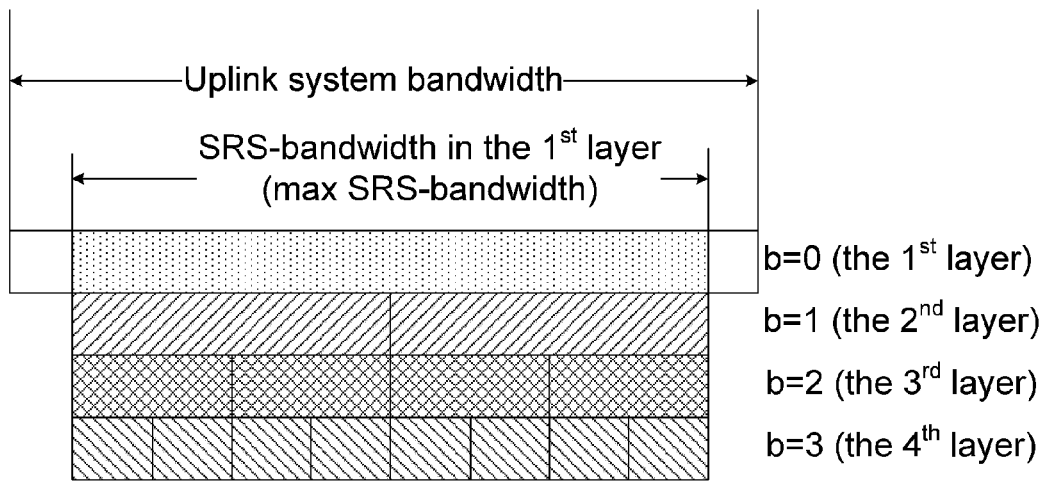
FIG. 3 is a schematic diagram of the tree structure of the SRS-bandwidth according to related art.
Figure 4:
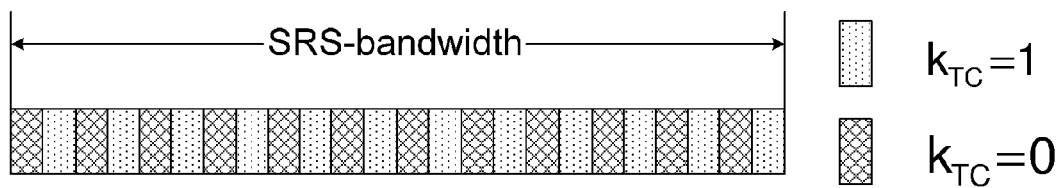
FIG. 4 is a schematic diagram of the comblike structure of the SRS signal according to related art.
Figure 5:
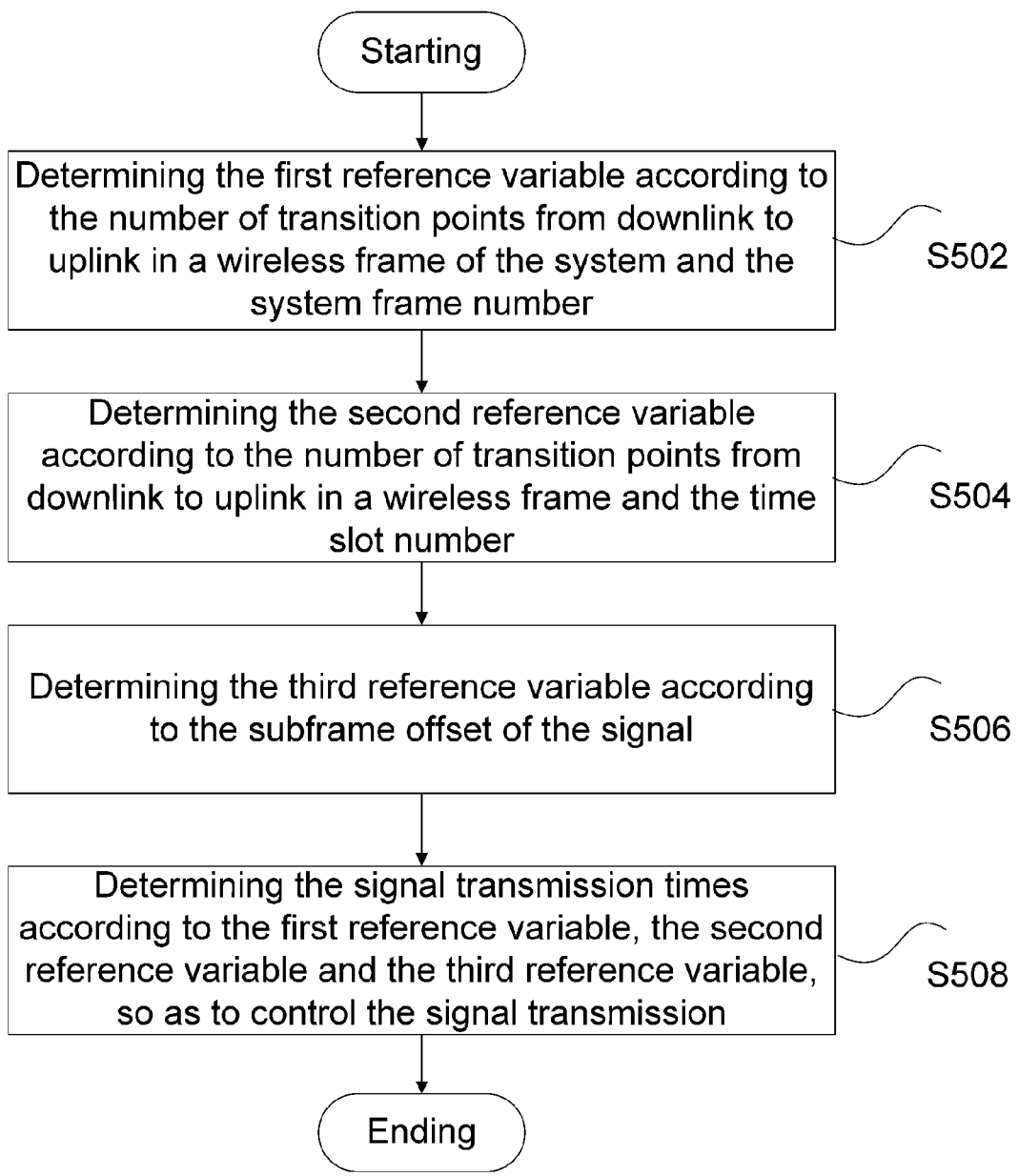
FIG. 5 is a flow chart of a method for controlling signal transmission according to the method embodiment of the present invention.

FIG. 5 is a flow chart of a method for controlling signal transmission according to the method embodiment of the present invention. As shown in FIG. 5, this method includes step S502 to step S508:

step S502: determining the first reference variable according to the number of transition points from downlink to uplink in a wireless frame of the system and the system frame number;

step S504: determining the second reference variable according to the number of transition points from downlink to uplink in a wireless frame and the time slot number;

step S506: determining the third reference variable according to the sub-frame offset of the signal; and step S508: determining signal transmission times according to the first reference variable, the second reference variable and the third reference variable, so as to control the signal transmission.

The details of the above-mentioned processing procedure are described below.

In order to make the UEs with the same SRS period have the same SRS transmission times at the same time and the transmission times is increasing continuously for the UE, then the first reference variable, the second reference variable and the third reference variable are determined firstly, namely steps S502 to S506 are executed; and then the transmission times of signals are determined according to the determined reference variables, namely step S508 is executed; wherein one SRS period corresponds to one or a plurality of sub-frame offsets.

In the specific implementation process, the processing procedure of calculating the corresponding reference variables according to the related parameters is: step S502, determining the first reference variable, the first reference variable $n_1$ may be determined according to the number of transition points from downlink to uplink in a wireless frame of the system (namely $N_{SP}$) and the system frame number (namely $n_f$), namely calculating the value of $n_1 = 2N_{SP}n_f$; step S504, determining the second reference variable, the second reference variable $n_2$ may be determined according to the number of transition points from downlink to uplink in a wireless frame (namely $N_{SP}$) and the time slot number (namely $n_s$), namely calculating the value of $$n_2 = 2(N_{SP} - 1)\left\lfloor \frac{n_s}{10} \right\rfloor;$$

step S506, determining the third reference variable, the third reference variable $n_3$ may be determined according to the sub-frame offset of the signal (namely $T_{offset}$, $T_{offset\_max}$ is the maximum sub-frame offset of the signal), namely calculating the value of $$n_3 = \left\lfloor \frac{T_{offset}}{T_{offset\_max}} \right\rfloor.$$

After the reference variables are determined, the transmission times of the signal $n_{SRS}$ may be determined, namely the sum of the first reference variable, the second reference variable and the third reference variable is treated as the transmission times of the signal $n_{SRS}$, $$n_{SRS} = 2N_{SP}n_f + 2(N_{SP} - 1)\left\lfloor \frac{n_s}{10} \right\rfloor + \left\lfloor \frac{T_{offset}}{T_{offset\_max}} \right\rfloor,$$

wherein $n_1 = 2N_{SP}n_f$ is the first reference variable, $$n_2 = 2(N_{SP} - 1)\left\lfloor \frac{n_s}{10} \right\rfloor$$

is the second reference variable, $$n_3 = \left\lfloor \frac{T_{offset}}{T_{offset\_max}} \right\rfloor$$

is the third reference variable, $N_{SP}$ is the number of transition points from downlink to uplink in a wireless frame, $n_f$ is the system frame number, $n_s$ is the time slot number, $T_{offset}$ is the sub-frame offset of the signal, $T_{offset\_max}$ is the maximum sub-frame offset of the signal, namely, $T_{offset\_max}$ is the maximum value of all the sub-frame offsets of SRS signals that allocated to a UE, $\lfloor\ \rfloor$ means rounding down, wherein $N_{SP}$, $n_f$, $n_s$ and $T_{offset}$ all are non-negative integers.

In the above-mentioned embodiment, in virtue of the method for calculating signal transmission times provided by the embodiment of the present invention, continuous SRS transmission times can be calculated, so as to make the UEs with the same SRS period have the same SRS transmission times at the same time, thereby the perfect frequency hopping performance can be obtained.

The present invention is described in details in connection with the preferred embodiments below.

Embodiment 1

Firstly, the values of the parameters are determined: the specific SRS period of the selected UE and the period to which the sub-frame offset configuration corresponds are 2 ms and sub-frame offset is {0, 1}, then $T_{offset\_max}=1$, $T_{offset}=0$ or 1, this UE transmits SRS on two symbols of the UpPTS, $n_s=3$ or 13, the uplink/downlink configuration is chosen as 1, then there are two transition points from downlink to uplink in a wireless frame, namely $N_{SP}=2$.

Then, if the values of the above-mentioned parameters are put into formula $$n_{SRS} = 2N_{SP}n_f + 2(N_{SP}-1)\left\lfloor\frac{n_s}{10}\right\rfloor + \left\lfloor\frac{T_{offset}}{T_{offset\_max}}\right\rfloor,$$

then:

(I) In the sub-frame with $n_f=2$, the times of the SRS transmitted by this UE are 8, 9, and 11, namely:

under the circumstance of $N_{SP}=2$, $n_f=2$, $n_s=3$, $T_{offset}=0$ and $T_{offset\_max}=1$, $n_{SRS}=8$; under the circumstance of $N_{SP}=2$, $n_f=2$, $n_s=3$, $T_{offset}=1$ and $T_{offset\_max}=1$, $n_{SRS}=9$; under the circumstance of $N_{SP}=2$, $n_f=2$, $n_s=13$, $T_{offset}=0$ and $T_{offset\_max}=1$, $n_{SRS}=10$; and under the circumstance of $N_{SP}=2$, $n_f=2$, $n_s=13$, $T_{offset}=1$ and $T_{offset\_max}=1$, $n_{SRS}=11$;

(II) In the sub-frame with $n_f=3$, the times of the SRS transmitted by this UE are 12, 13, 14 and 15, namely:

Under the circumstance of $N_{SP}=2$, $n_f=3$, $n_s=3$, $T_{offset}=0$ and $T_{offset\_max}=1$, $n_{SRS}=12$; under the circumstance of $N_{SP}=2$, $n_f=3$, $n_s=3$, $T_{offset}=1$ and $T_{offset\_max}=1$, $n_{SRS}=13$; under the circumstance of $N_{SP}=2$, $n_f=3$, $n_s=13$, $T_{offset}=0$ and $T_{offset\_max}=1$, $n_{SRS}=14$; and under the circumstance of $N_{SP}=2$, $n_f=3$, $n_s=13$, $T_{offset}=1$ and $T_{offset\_max}=1$, $n_{SRS}=15$.

From the above-mentioned calculation results, it may be seen that SRS transmission times increase continuously.

Embodiment 2

Firstly, the values of the parameters are determined: the specific SRS period of the selected UE and the period to which sub-frame offset configuration corresponds are 2 ms and sub-frame offset is {1, 4}, then $T_{offset\_max}=4$, $T_{offset}=1$ or 4, this UE transmits SRS on the second symbol in the UpPTS and on the third uplink sub-frame of a half-frame, $n_s=3$ or 19, the uplink/downlink configuration is chosen as 0, then there are two transition points from downlink to uplink in a wireless frame, namely $N_{SP}=2$.

Then, if the values of the above-mentioned parameters are put into formula $$n_{SRS} = 2N_{SP}n_f + 2(N_{SP}-1)\left\lfloor\frac{n_s}{10}\right\rfloor + \left\lfloor\frac{T_{offset}}{T_{offset\_max}}\right\rfloor,$$

then:

(I) In the sub-frame with n=2, the times of the SRS transmitted by this UE are 8, 9, and 11, namely:

Under the circumstance of $N_{SP}=2$, $n_f=2$, $n_s=3$, $T_{offset}=1$ and $T_{offset\_max}=4$, $n_{SRS}=8$; under the circumstance of $N_{SP}=2$, $n_f=2$, $n_s=3$, $T_{offset}=4$ and $T_{offset\_max}=4$, $n_{SRS}=9$; under the circumstance of $N_{SP}=2$, $n_f=2$, $n_s=19$, $T_{offset}=1$ and $T_{offset\_max}=4$, $n_{SRS}=10$; and under the circumstance of $N_{SP}=2$, $n_f=2$, $n_s=19$, $T_{offset}=N_{SP}=2$, $n_f=2$, $n_s=19$, $T_{offset}=4$ and $T_{offset\_max}=4$, $n_{SRS}=11$;

(II) In the sub-frame with $n_f=3$, the times of the SRS transmitted by this UE are 12, 13, 14 and 15, namely:

Under the circumstance of $N_{SP}=2$, $n_f=3$, $n_s=3$, $T_{offset}=1$ and $T_{offset\_max}=4$, $n_{SRS}=12$; under the circumstance of $N_{SP}=2$, $n_f=3$, $n_s=3$, $T_{offset}=4$ and $T_{offset\_max}=4$, $n_{SRS}=13$; under the circumstance of $N_{SP}=2$, $n_f=3$, $n_s=19$, $T_{offset}=1$ and $T_{offset\_max}=4$, $n_{SRS}=14$; and under the circumstance of $N_{SP}=2$, $n_f=3$, $n_s=19$, $T_{offset}=4$ and $T_{offset\_max}=4$, $n_{SRS}=15$.

From the above-mentioned calculation results, it may be seen that SRS transmission times increase continuously.

Device Embodiment

According to the embodiments of the present invention, a device for controlling signal transmission is provided.

Figure 6:
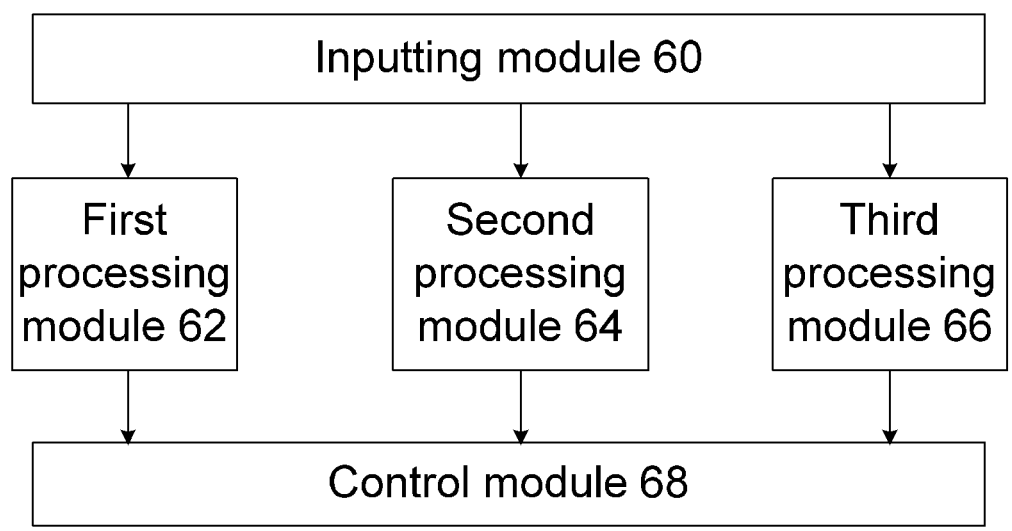
FIG. 6 is a block diagram of a device for controlling signal transmission according to the device embodiment of the present invention.

FIG. 6 shows the structure of the device for controlling signal transmission according to the device embodiment of the present invention. As shown in FIG. 6, this device comprises: an inputting module 60, a first processing module 62, a second processing module 64, a third processing module 66 and a control module 68.

The functions of the above-mentioned modules are described in details below.

the inputting module 60, used to input the number ($N_{SP}$) of transition points from downlink to uplink in a wireless frame of the system, the system frame number ($n_f$), the time slot number ($n_s$) and the sub-frame offset ($T_{offset}$) of the signal;

the first processing module 62, connected to the inputting module 60, and is used to determine the first reference variable $n_1$ according to the number ($N_{SP}$) of transition points from downlink to uplink in a wireless frame of the system and the system frame number ($n_f$);

the second processing module 64, connected to the inputting module 60, and is used to determine the second reference variable $n_2$ according to the number ($N_{SP}$) of transition points from downlink to uplink in a wireless frame and the time slot number ($n_s$);

the third processing module 66, connected to the inputting module 60, and is used to determine the third reference variable $n_3$ according to the sub-frame offset ($T_{offset}$) of the signal;

the control module 68, connected to the first processing module 62, the second processing module 64 and the third processing module 66, and the control module 68 is used to determine transmission times ($n_{SRS}$) of the signal according to the first reference variable ($n_1$) determined by the first processing module, the second reference variable ($n_2$) determined by the second processing module and the third reference variable ($n_3$) determined by the third processing module. In the specific implementation process, preferably, the control module 68 may be an adder.

The continuous SRS transmission times can be calculated through the device for controlling signal transmission provided by the embodiments of the present invention, so as to make the UEs with the same SRS period have the same SRS transmission times at the same time, thereby the perfect frequency hopping performance can be obtained.

To summarize, in virtue of the method and/or device for controlling signal transmission provided by the present invention, by calculating the corresponding reference variables (the first reference variable, the second reference variable and the third reference variable) according to the related parameters (the number of transition points from downlink to uplink in a wireless frame, the system frame number, the time slot number, the sub-frame offset of the signal and the maximum sub-frame offset of the signal) and treating the sum of these reference variables as the transmission times, the continuous SRS transmission times can be calculated, and the aim can be achieved that the UEs with the same SRS period have the same SRS transmission times at the same time and the transmission times increase continuously for the UE, thereby the perfect frequency hopping performance can be obtained.

According to the embodiments of the present invention, a computer readable medium is provided as well. The computer readable medium carries program code. When the program code being executed, processor may be triggered to execute the method for controlling signal transmission according to the embodiment of the present invention, which is as above-mentioned specifically. The processor may be installed in computer or network system. The present invention is not limited to any software and/or hardware combination which is used to realize the above-mentioned readable medium or processor.

The above are preferred embodiments of the present invention and are not intended to limit the present invention. For those skilled in the art, the present invention may have various changes and modifications. Any modification, identical replacement and improvement made without departing from the spirit and principle of the present invention shall be within the protection scope of the present invention.

What is claimed is:

1. A method for controlling signal transmission, comprising:
    determining a first reference variable, $n_1$, according to the number of transition points from downlink to uplink in a wireless frame of a system, $N_{SP}$, and a system frame number, $n_f$;
    determining a second reference variable, $n_2$, according to the number of transition points from downlink to uplink in said wireless frame, $N_{SP}$, and a time slot number, $n_s$;
    determining a third reference variable, $n_3$, according to a sub-frame offset of a signal, $T_{offset}$, and a maximum sub-frame offset of said signal, $T_{offset\_max}$; and
    determining transmission times of said signal, $n_{SRS}$, according to the first reference variable, $n_1$, the second reference variable, $n_2$, and the third reference variable, $n_3$, using the following formula:
    $$n_{SRS} = n_1 + n_2 + n_3$$
    wherein $n_1 = 2N_{SP}n_f$,
    $$n_2 = 2(N_{SP} - 1)\left\lfloor \frac{n_s}{10} \right\rfloor,$$
    $$n_3 = \left\lfloor \frac{T_{offset}}{T_{offset\_max}} \right\rfloor,$$
    and $N_{SP}$, $n_f$, $n_s$ and $T_{offset}$ are non-negative integers.

2. A device for controlling signal transmission, comprising:
    an inputting module, being used to input the number of transition points from downlink to uplink in a wireless frame of a system, $N_{SP}$, a system frame number, $n_f$, a time slot number, $n_s$, a sub-frame offset of a signal, $T_{offset}$, and a maximum sub-frame offset of the signal, $T_{offset\_max}$;
    a first processing module, being used to determine a first reference variable, $n_1$, according to $n_1 = 2N_{SP}n_f$;
    a second processing module, being used to determine a second reference variable, $n_2$, according to
    $$n_2 = 2(N_{SP} - 1)\left\lfloor \frac{n_s}{10} \right\rfloor$$
    a third processing module, being used to determine a third reference variable $n_3$, according to
    $$n_3 = \left\lfloor \frac{T_{offset}}{T_{offset\_max}} \right\rfloor;$$
    and
    a control module, being used to determine a transmission times of the signal, $n_{SRS\ 1}$, with the following formula:
    $$n_{SRS} = n_1 + n_2 + n_3,$$
    wherein $N_S$, $n_f$, $n_s$ and $T_{offset}$ are non-negative integers.

3. The device according to claim 2, wherein the control module is an adder.

* * * * *